United States Patent [19]

Nakamura

[11] 4,255,862
[45] Mar. 17, 1981

[54] CONFIGURED CONTOUR MEASURING APPARATUS

[75] Inventor: Tetsuo Nakamura, Kawasaki, Japan

[73] Assignee: Mitutoyo Manufacturing Company Inc., Tokyo, Japan

[21] Appl. No.: 85,272

[22] Filed: Oct. 16, 1979

[30] Foreign Application Priority Data

Oct. 26, 1978 [JP] Japan .............................. 53-132272

[51] Int. Cl.³ .............................................. G01B 7/28
[52] U.S. Cl. .................................... 33/174 L; 33/1 M; 33/174 P; 33/169 R; 33/DIG. 2
[58] Field of Search ............. 33/174 L, 174 P, 174 Q, 33/169 R, 172 E, 143 L, 174 TA, 179.5 R, 179.50, DIG. 2, 1 M, 174 R

[56] References Cited

U.S. PATENT DOCUMENTS

| | | | |
|---|---|---|---|
| 3,161,962 | 12/1964 | Pettavier et al. | 33/169 R |
| 3,334,541 | 8/1967 | Delp | 33/1 M |
| 3,504,441 | 4/1970 | Linley et al. | 33/174 L |
| 3,555,916 | 1/1971 | Santy | 33/174 TA |
| 3,749,501 | 7/1973 | Wieg | 33/1 M |
| 3,774,311 | 11/1973 | Stemple | 33/174 R |
| 3,818,596 | 6/1974 | Stemple et al. | 33/1 M |
| 3,840,993 | 10/1974 | Shelton | 33/1 M |
| 4,069,589 | 1/1978 | Rameson | 33/174 P |
| 4,155,173 | 5/1979 | Sprandel | 33/174 L |

Primary Examiner—Willis Little
Attorney, Agent, or Firm—Koda and Androlia

[57] ABSTRACT

A configured contour measuring apparatus comprising: a table movably provided on a bed; a driving mechanism for moving said table; first detecting mechanisms for detecting a value of movement of said table relative to the bed as a digital signal; a mount base provided on said table and made movable in a direction perpendicular to movement of said table; a detecting head secured to a column erected on said bed; a sliding shaft slidably provided on said detecting head and having a stylus at the lower end thereof in opposed relationship with said mount base; a balancer weight connected through a hanging line to said sliding shaft and made slightly lighter in weight than said sliding shaft; pulleys for supporting the intermediate portion of said hanging line; and second detecting mechanisms for detecting a value of movement of said sliding shaft as a digital signal.

8 Claims, 12 Drawing Figures

CONFIGURED CONTOUR MEASURING APPARATUS

BACKGROUND OF THE INVENTION

1. Field of the Invention

This invention relates to a configured contour measuring apparatus for measuring the surface contour in a predetermined cross-section of an object to be measured.

2. Description of the Prior Art

The conventional configured contour measuring apparatus (contracer) is of such an arrangement that a fulcrum is provided at the intermediate portion of an arm, a proving needle referred to as a stylus is secured to one end of the arm, a balancer weight is secured to the other end of the arm, the stylus is made slightly heavior in weight than the balancer weight so as to make the stylus touch the surface of an object to be measured, said arm is axially moved, whereby the movement of the stylus tracing the surface countour is measured by a differential transformer secured to the arm; and signals sent from said differential transformer are transimitted to a recorder to make same draw a figure, whereby the configured contour of the object to be measured is measured. However, in the conventional configured contour measuring apparatus as described above, a figure is recorded by the so-called analogue values, and hence, it is necessary to read the contour as digital values by further use of some measuring apparatus. From the above reasons, there have been such disadvantages that not only the measurement is troublesome but also some errors tend to be added in converting to the digital values, hence to decrease the accuracies in the contour measurement. Therefore, necessity has been voiced for development of a configured contour measuring apparatus capable of directly reading the digital values.

To meet the necessity, there has been proposed a configured contour measuring apparatus of said arm-type wherein an A/D converter is additionally provided, so that the digital values can be directly read. However, said measuring apparatus substantially measures the analogue values, and consequently, said disadvantages have not been obviated. Furthermore, there has been proposed a configured contour measuring apparatus of the type wherein a linear scale consisting of a calibrated glass bar is secured to an arm of an arm-type configured control measuring apparatus, an index scale is provided in opposed relationship with said linear scale, and measurement is made on the movements of said both scales. However, in that case, errors due to the circularly arcuate motion of the arm should be unavoidable, and any satisfactory configured contour measuring apparatus has not been obtained at all.

SUMMARY OF THE INVENTION

An object of the present invention is to provide a configured contour measuring apparatus capable of directly reading digital values and having high measuring accuracies.

According to the present invention, a mount base is movably provided in a direction perpendicular to the moving direction of a table on said table movably provided on a bed, a sliding shaft is slidably provided on a detecting head secured to a column erected on the bed, said sliding shaft is provided at the lower end thereof with a stylus opposed to mount base and connected to a balancer weight through a hanging line whose intermediate portion is suspensively wound around pulleys, and the movements of said table and the sliding shaft are adapted to be detected by detecting mechanisms capable of taking out digital signals, thereby contemplating to achieve the aforesaid object.

Namely, the present invention can provide a configured contour measuring apparatus comprising:

a table movably provided on a bed;

a driving mechanism for moving said table;

first detecting mechanisms for detecting a value of movement of said table relative to the bed as a digital signal;

a mount base provided on said table and made movable in a direction perpendicular to the moving direction of said table;

a detecting head secured to a column erected on said bed;

a sliding shaft slidably provided on said detecting head and having a stylus at the lower end thereof in opposed relationship with said mount base;

a balancer weight connected through a hanging line to said sliding shaft and made slightly lighter in weight than said sliding shaft;

pulleys for supporting the intermediate portion of said hanging line; and second detecting mechanisms for detecting a movement value of said sliding shaft as a digital signal.

DESCRIPTION OF THE PREFERRED EMBODIMENT

Figure 1:
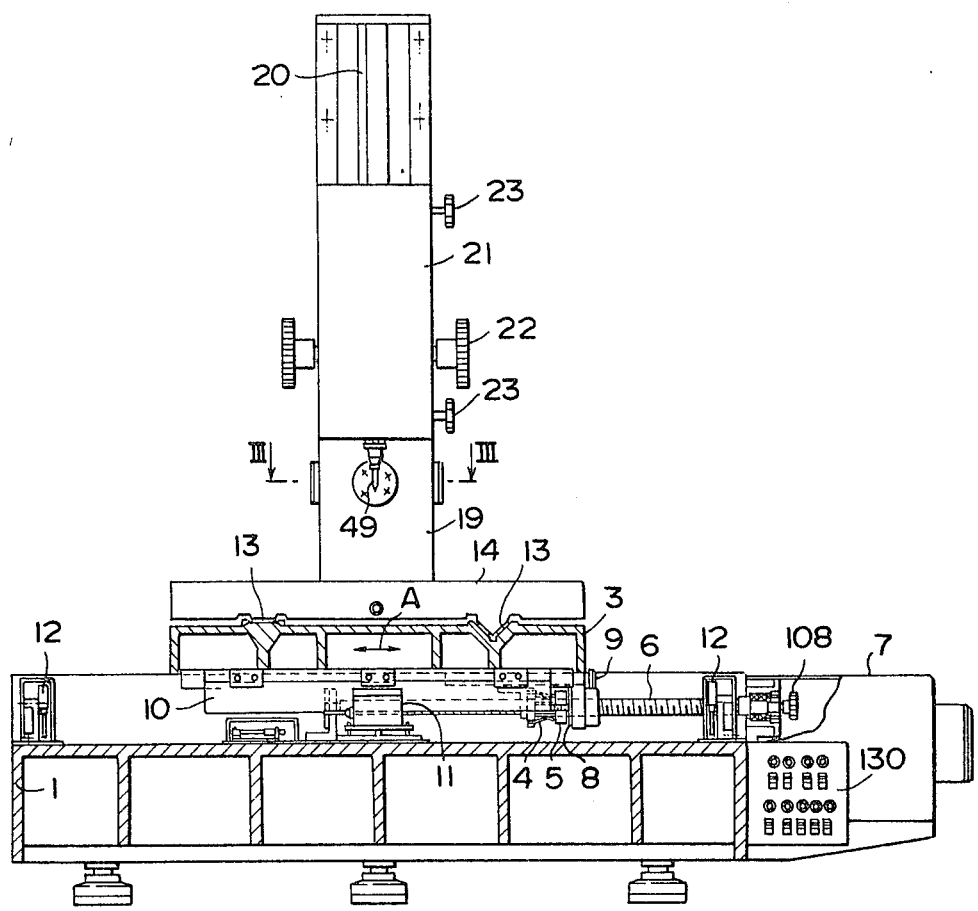
FIG. 1 is a front view showing one embodiment of the configured contour measuring apparatus of the present invention, with essential portions being shown in cross-section.

Description will hereunder be given of one embodiment of the present invention with reference to the drawings.

An outline of general construction will be described with reference to FIGS. 1 and 2. Provided on a bed 1 is a table 3 movable to the right and left in FIG. 1, i.e., in the directions indicated by an arrow A. Provided at the undersurface of said table 3 is a split nut 5 biased in the contracting direction by a spring 4, said split nut 5 is threadably coupled onto a feed screw shaft 6 rotatably provided on a bed 1, and said feed screw shaft 6 is connected to a driving mechanism 7 which is provided adjacent the bed 1 and will hereinafter be described in detail. Said driving mechanism 7 is driven to rotate the feed screw shaft 6, whereby the split nut 5 is moved linearly, so that the table 3 can be moved in the directions indicated by the arrow A in FIG. 1. Furthermore, secured to the split nut 5 is a handle 9 through a cam mechanism 8. Operation of said handle 9 causes the cam mechanism 8 to open the split nut 5, which is released from threadable coupling with the feed screw shaft 6, so that the table 3 can be freely moved in the directions indicated by the arrow A by manual operation.

Solidly secured to the undersurface of said table 3 is a glass scale 10 having vertically strip graduations thereon. A measuring mechanism 11 provided on the bed 1 is opposed to said glass scale 10, both of which constitute first detecting mechanisms capable of reading a movement value of the table 3 as a digital value. Furthermore, respectively provided at opposite ends of the bed 1 as shown in FIG. 1 are sensing mechanisms 12 each comprising a limit switch and the like for regulating the movement value of the table 3 in the directions indicated by the arrow A. Provided on the upper surface of said table 3 is a mount base 14 for mounting thereon with an object to be measured through rollers 13. Said mount 14 is made movable in the directions perpendicular to the moving direction of the table 3, i.e., in the directions indicated by an arrow B in FIG. 2. Stretched between said mount base 14 and the table 3 is a tensile spring 15, with which the mount base 14 is constantly biased to the left in FIG. 2, the tip end of a spindle 17 of the microhead 16 abuts against the mount base 14 in the direction of resisting against said biasing force, and said spindle 17 is fixed on the table 3 through a bracket 18. With the arrangement as described above, rotation of the microhead 16, measuring the positions of the mount base 14 gradually by the predetermined value, moves the mount base 14 in cooperation with the tensile spring 15 in the directions indicated by the arrow B.

A column 19 is erected at the rear portion of the bed 1, and secured to a guide 20 provided in front of said column 19 is a detecting head 21 being vertically movable. Rotation of a handle 22 causes said detecting head 21 to be moved vertically, and thereafter, said detecting head 21 is fixed by a clamp screw 23.

Figure 3:
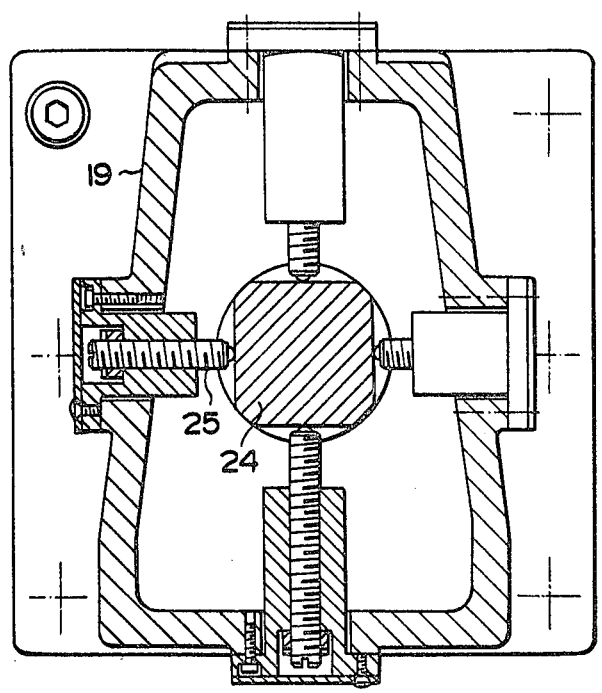
FIG. 3 is a sectional view taken along the line III—III in FIG. 2.

FIG. 3 shows the internal construction of said column 19, and provided at the center in the column 19 is a column control bar 24 having a high rigidity in the vertical direction. Said column control bar 24 is subjected at predetermined positions on the outer periphery thereof to four-side planing to be shaped to provide a prismatic portion. Adjusting screws 25 linearly movably secured to the column 19 abut against the respective planes thus obtained, so that the curvature and the like of the column 19 can be corrected by the adjustment of said adjusting screws 25.

FIGS. 4 through 7 shows the internal construction of the detecting head 21. Said detecting head 21 is constructed such that said detecting head is provided with a frame 27 having a dovetail groove 26 engageable with a guide 20 of said column 19, secured to said frame 27 are said handle 22 and the clamp screw 23, and solidly secured to a shaft 28 provided at the center of the handle 22 is a pinion 29 meshing with a rack 31 provided on said guide 20. With the arrangement as described above, rotation of the handle 22 causes the frame 27 to be moved vertically along the rack 31, so that the vertical position of the detecting head 21 relative to the column 19 can be arbitrarily selected.

The front surface of said frame 27 is covered by a cover 32, within which a guide block 34 is secured to the frame 27 through a support frame 33. Said guide block 34 is formed into a thick walled tubular shape being square in cross-section, and penetratingly provided therein with a square hole 35, into which a hollow square shaft 36 is slidably inserted. Grooves 37 are formed at the central portions at four sides of the outer periphery of said square shaft 36 in the longitudinal directions over the total lengths. Furthermore, air feed ports 38 in two rows and at three stages are provided at the upper and lower portions of the respective surfaces of said guide block 34, outer ends of said air feed ports 38 are connected to air pipes not shown, nozzles at inner ends of said air feed ports 38 are open in opposed relationship with sliding surfaces at opposite sides of the grooves 37 provided at the respective surfaces of said square shaft 36. With the arrangement as described above, if compressed air is fed to the respective air feed ports 38, air blown out of the nozzles at the inner ends of the air feed ports 38 enters a space formed between the square shaft 36 and the square hole 35, the square shaft 36 is brought into a condition of being floated within the square hole 35, thereby forming a pneumatic bearing.

Figure 7:
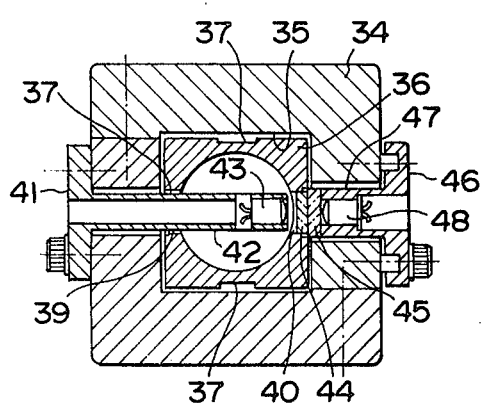
FIG. 7 is a sectional view taken along the line VII—VII in FIG. 5.
Figure 8:
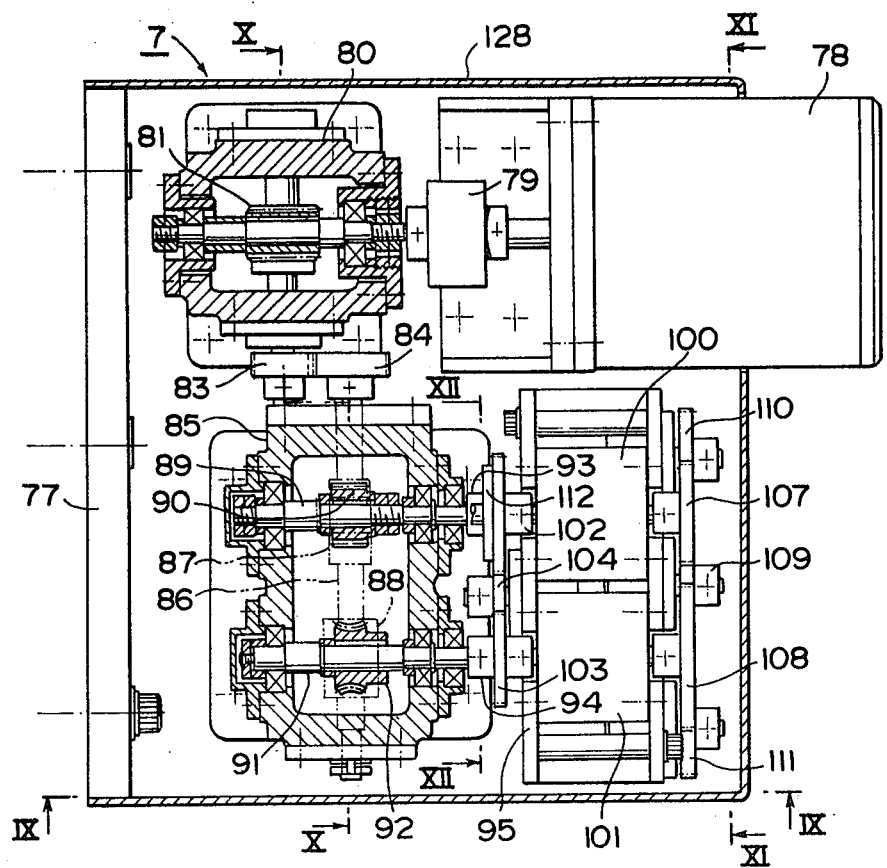
FIG. 8 is a transverse sectional view showing the driving mechanism used in the embodiment shown in FIG. 1.
Figure 9:
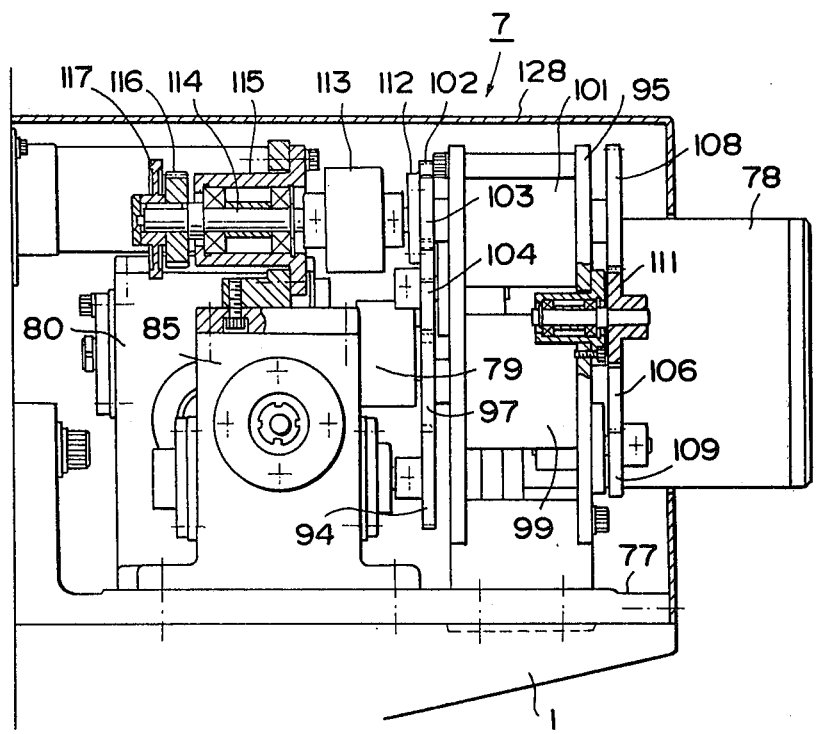
FIG. 9 is a sectional view taken along the line IX—IX in FIG. 8, with essential portions being broken away.

Provided at a pair of side faces relatively opposed to each other of said square shaft 36, i.e., at the centers of opposite side faces as shown in FIG. 7 are slots 39 and 40 in a manner to extend longer than the vertically moving distance of the square shaft 36. Inserted into the slot 39 at the left hand is a projection 42 of a light emitting element mount 41, and secured to the forward end of said projection 42 are four light emitting elements 43 arranged in the vertical direction. On the other hand, coupled into the slot 40 at the right hand is a linear scale 44 formed of a long glass bar and having the vertically striped graduations. Furthermore, an index scale 45 having the similar vertically striped graduations is disposed closed to the linear scale 44 in opposed relationship with said light emitting elements 43, said index scale 45 is solidly secured to the forward end of a projection 47 of light receiving element mount 46 secured to the guide block 34, and four light receiving elements 48 arranged in the vertical direction are secured to the light receiving element mount 46 in opposed relationship with said light emitting elements 43, respectively, in said index scale 45. With the arrangement as described above, the relative movement between the linear scale 44 and the index scale 45 due to a vertical movement of the square shaft 36 within the guide block 34 can be read by the light emitting elements 43 and light receiving elements 48 as a digital value. Furthermore, said light emitting elements 43, linear scale 44, index scale 45 and light receiving elements 48 constitute second detecting mechanisms.

A stylus (probing needle) 49 for coming into contact with an object to be measured is secured to the lower end of said square shaft 36, and one end of a hanging line 51 is secured to the upper end thereof through a mounting disk 50. Said hanging line 51 is suspensively wound around two pulleys 52 and 53, and solidly secured at the other end to the upper end of a balancer weight 54, which is made slightly lighter in weight than the square shaft 36, whereby the square shaft 36 is slowly lowered in the normal condition.

Said pulleys 52, 53 are rotatably supported by a hollow shaft 57 secured to an upper support frame 55 through a thrust air tube 56, respectively. Said hollow shaft 57 is blocked at one end thereof, connected at the other end thereof to an air pipe 58, and further, provided at the intermediate portion thereof to which said pulleys 52, 53 are secured with a multiplicity of air ejection ports 59. Air blown out of said air ejection ports 59 enters a gap formed between the pulleys 52, 53 and the hollow shaft 57, thus forming a so-called pneumatic bearing. Furthermore, a plurality of holes 60 are formed in said thrust air tube 56 in the axial direction, ends of said holes 60 are open to the end faces of said pulleys 52, 53, the other ends thereof are communicated with air ports 63 formed in the upper support frame 55 through through-holes 61 and peripheral grooves 62, and air pipes 64 are connected to said air ports 63. With the arrangement as described above, air fed from the air pipes 64 passes through the air ports 63, peripheral grooves 62 and through-holes 61, enters the holes 60, and is blown out into the gaps formed between the end faces of the thrust air tube 56 and the end faces of the pulleys 52, 53, thus reducing the friction at thrust surfaces of the pulleys 52, 53.

Figure 4:
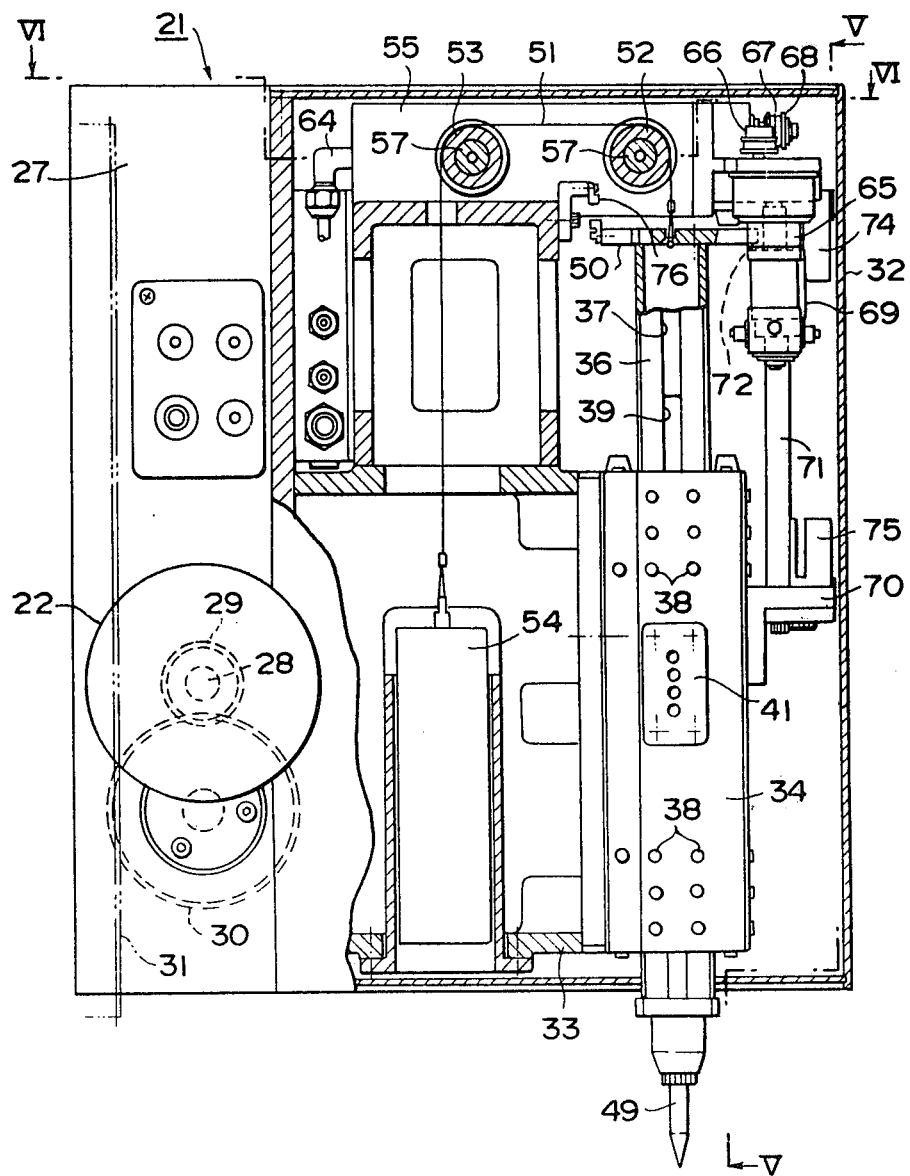
FIG. 4 is a side view of the detecting head used in the embodiment shown in FIG. 1, with essential portions being shown in cross-section.
Figure 5:
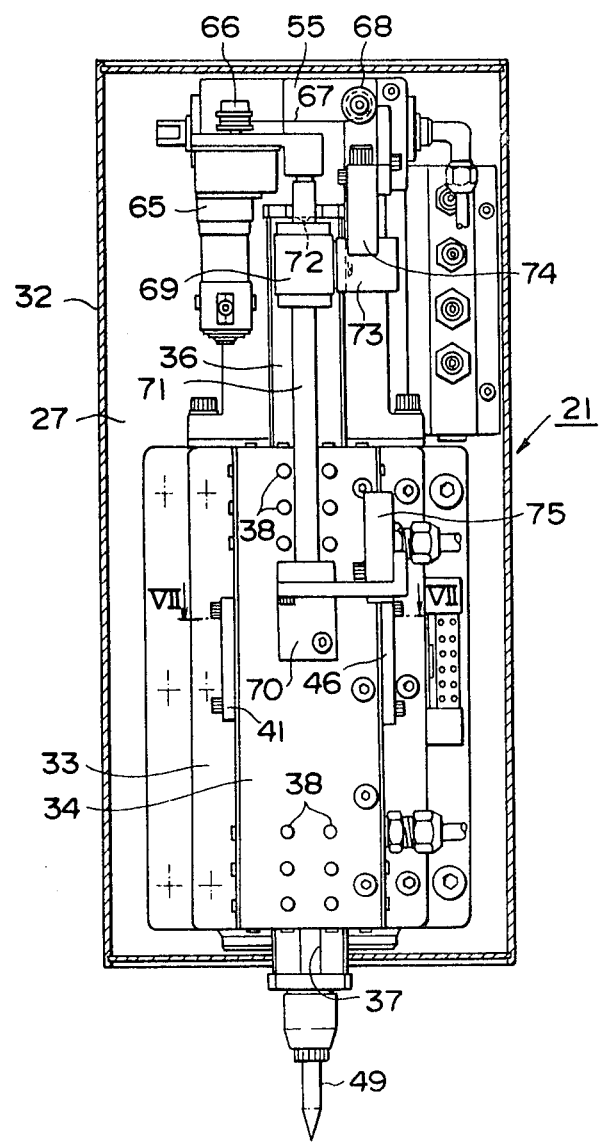
FIG. 5 is a sectional view taken along the line V—V in FIG. 4.
Figure 6:
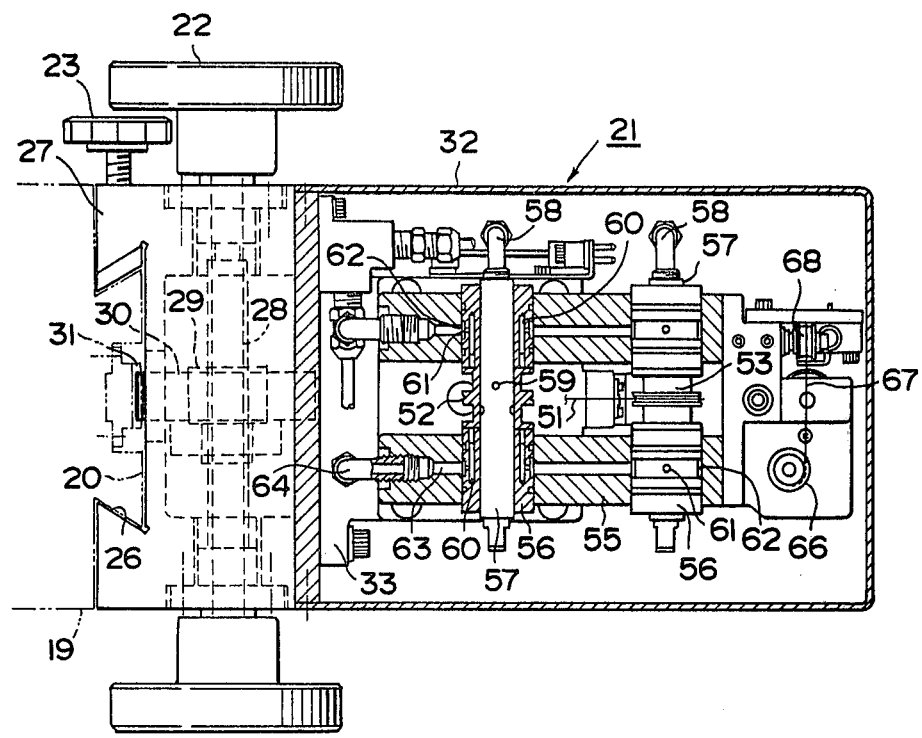
FIG. 6 is a sectional view taken along the line VI—VI in FIG. 4.

A motor 65 with a gearing is secured to said upper support frame 55, and one end of a wire 67 is solidly secured to a windup pulley 66 fixed on an output shaft of said motor 65. Said wire 67 is wound at the intermediate portion thereof around an intermediate pulley 68, and solidly secured at the other end thereof to a guide tube 69. Said guide tube 69 is vertically, movably provided on a guide shaft 71 formed with splines and interposed between said upper support frame 55 and a bracket 70 fixed on the guide block 34. Furthermore, opposed to the upper end face of said guide tube 69 is the undersurface of the forward end of the mounting plate 50 fixed on the upper end of said square shaft 36, so that a semi-spherical projection 72 provided at said undersurface can be brought into contact with the upper end face of the guide tube 69. Further, a working member 73 formed of a steel plate is solidly secured to a side surface of the guide tube 69. Respectively provided at the upper and lower ends of a stroke within which said working member 73 is movable due to the vertical movement of the guide tube 69 are sensing mechanisms 74, 75 each constituted by a reed switch. Said sensing mechanisms 74, 75 is each formed with a groove in which said working member 73 can be received (Refer to FIG. 4), and the lower sensing mechanism 75 is secured to the bracket 70. With the arrangement as described above, operation of the motor 65 causes the guide tube 69 to be moved vertically, the upper and lower limits of said vertical movement is sensed through the working member 73 by the sensing mechanisms 74, 75, and further, the square shaft 36 is vertically moved due to the vertical movement of the guide tube 69 in the normal condition. Additionally, designated at a reference numeral 76 in FIG. 4 is a stopper 36 solidly secured to the upper support frame 55.

FIGS. 8 through 12 show the internal construction of the driving mechanism 7. The driving mechanism 7 is provided thereon with a base bracket 77 solidly secured to the bed 1, and secured to said base bracket 77 is a driving motor 78. An output shaft of said motor 78 is connected to a first gear box 80 through a coupling 79, and said gear box 80 is provided therein with a worm 81 and a worm wheel 82. Said first gear box 80 is connected to a second gear box 85 through intermediate gears 83, 84, a helical gear 87 and a worm 88 are fixed on the intermediate portion of an input shaft 86 of said second gear box 85, and respectively meshed with said helical gear 87 and worm 88 are a helical gear 90 fixed on a first output shaft 89 and a worm wheel 92 fixed on a second output shaft 91. With the arrangement as described above, a high number of revolution can be taken off the first output shaft 89 of the second gear box 85 and a low number of revolutions off the second output shaft 91. Additionally, gears 93 and 94 are soldily secured to the output ends of said first output shaft 89 and second output shaft 91, respectively.

Figure 12:
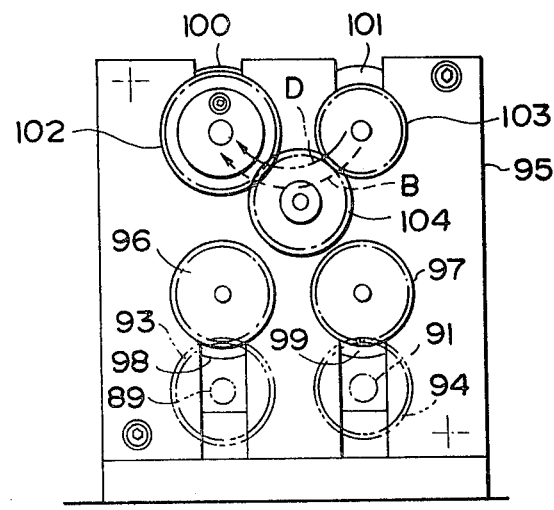
FIG. 12 is a view in the direction indicated by the arrows from line XII—XII in FIG. 11.

The gears 93 and 94 at the output ends of said second gear box 85 are meshed with a first and a second gears 96 and 97 of a gear clutch box, respectively. Said gear clutch box 95 includes first through fourth clutches 98, 99, 100 and 101, and, as shown in FIG. 12, first through fourth gears 96, 97, 102 and 103 are solidly secured to ends of said clutches 98 through 101, i.e., the ends opposed to the second gear box 85, respectively, so that said third and fourth gears 102 and 103 are operationally associated by an intermediate gear 104. Additionally, the third gear 102 constitutes a gear at the output end.

Figure 11:
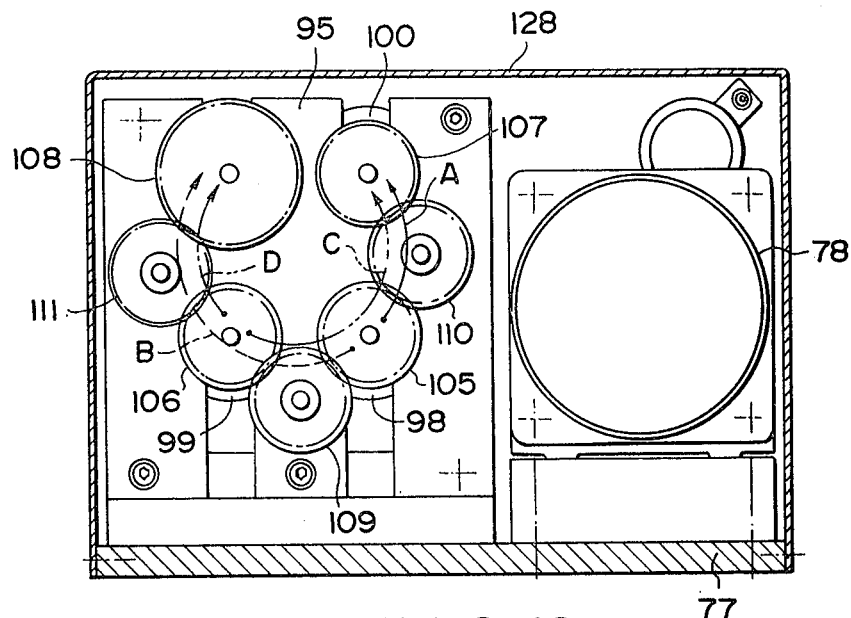
FIG. 11 is a sectional view taken along the line XI—XI in FIG. 8.

As shown in FIG. 11, respectively solidly secured to the other ends of said first through fourth clutches 98, 99, 100 and 101, i.e., the opposite ends to the second gear box 85 are fifth through eighth gears 105, 106, 107 and 108. Respectively interposed between the fifth and sixth gears 105 and 106, between the fifth and seventh gears 105 and 107, and between the sixth and eighth gears 106 and 108 are intermediate gears 109, 110 and 111 for operational association therebetween. With the arrangement as described above, the respective clutches 98 through 101 are suitably turned on or off, so that four different numbers of revolutions can be imparted to the third gear 102 at the output end.

More specifically, if the first clutch 98 and third clutch 100 are tuned on and the second clutch 99 and fourth clutch 101 are turned off, then rotation of the gear 93 on the high speed rotation side of the second gear box 85 is transmitted to the third gear 102 through the first gear 96, first clutch 98, fifth gear 105, intermediate gear 110, seventh gear 107 and third clutch 100 (Refer to the solid line arrow A), thus enabling to obtain the highest number of revolutions. Next, if the first and fourth clutches 98 and 101 are turned on and the second and third clutches are turned off, then rotation of said gear 93 rotating at a high speed is transmitted to the third gear 102 through the first gear 96, first clutch 98, fifth gear 105, intermediate gear 109, sixth gear 106, intermediate gear 111, eighth gear 108 and fourth clutch 101, fourth gear 103 and intermediate gear 104 (Refer to a broken line arrow B), thus enabling to obtain the second high number of revolutions. Next, if the second and third clutches 99 and 100 are turned on and the first and fourth clutches 98 and 101 are turned off, then rotation of the gear 94 on the low speed rotation side of the second gear box 85 is transmitted to the third gear 102 through the second gear 97, second clutch 99, sixth gear 106, intermediate gear 109, fifth gear 105, intermediate gear 110, seventh gear 107 and third clutch 100 (Refer to one dot chain line arrow C), thus enabling to obtain the third high number of rotation. Next, if the second and fourth clutches 99 and 101 are turned on and the first and third clutches 98 and 100 are turned off, then rotation of said low speed gear 94 is transmitted to the third gear 102 through the second gear 97, second clutch 99, sixth gear 106, intermediate gear 111, eighth gear 108, fourth clutch 101, fourth gear 103 and intermediate gear 104 (Refer to the two dot chain line arrow D), thus enabling to obtain the lowest number of revolutions.

Figure 10:
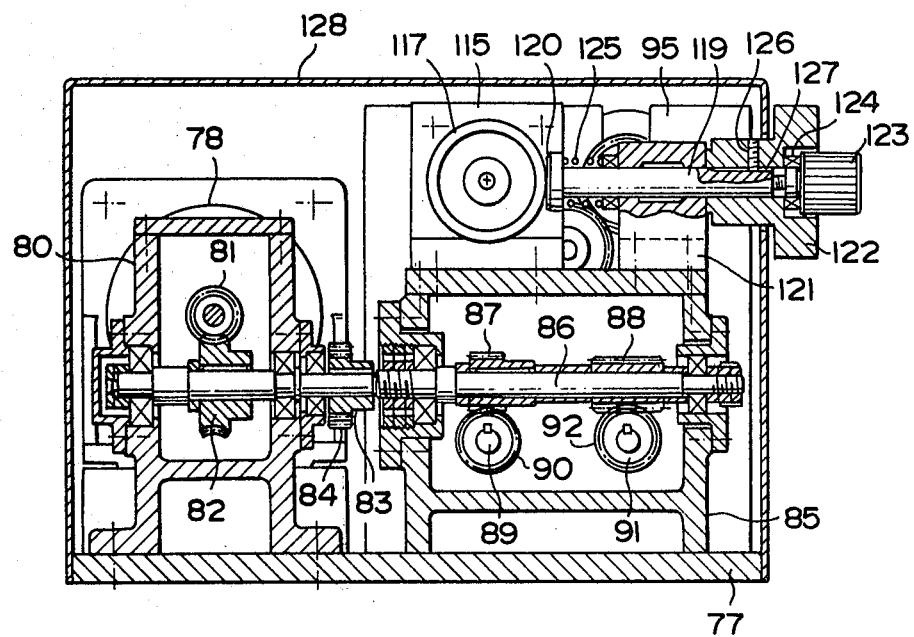
FIG. 10 is a sectional view taken along the line X—X in FIG. 8.

Connected to said third gear 102 through a connecting disk 112 and a clutch 113 is an output rotary shaft 114. Said rotary shaft 114 is supported by said second gear box 85 through a bearing 115, and solidly secured to a projection from a bearing 115 of said rotary shaft 114 are an output gear 116 and a manually rotatable pulley 117. Said output gear 116 is meshed with a gear 118 fixed on the right end of the feed screw shaft 6 in FIG. 1, whereby a driving force from the driving mechanism 7 is transmitted to the feed screw shaft 6. On the other hand, a rubber pad 120 fixed on on one end of a manually rotatable shaft 119 can be brought into abutting contact with the peripheral surface of the manually rotatable pulley 117 as shown in FIG. 10. Said manually rotatable shaft 119 is rotatably, slidably supported by a bearing 121 provided on the upper surface of the second gear box 85, a manually operated grip 122 is provided on the other end of the manually rotatable shaft 119 in a manner to be axially movable and unrotatable, and threadably coupled to the end face of the manually rotatable shaft 119 is a rotatable shaft moving screw 123. Said screw 123 is brought into abutting contact with the manually operated grip 122 through a bearing metal 124, and rotation of said screw 123 causes the threaded condition between the screw 123 and the manually rotatable shaft 119 to change, so that the manually rotatable shaft 119 can move to the right and left in the bearing 121 as shown in FIG. 10. Confined between one end portion of said manually rotatable shaft 119, i.e., the end portion where the rubber pad 120 is formed and the bearing 121, whereby the manually rotatable shaft 119 is constantly biased toward the manually rotatable pulley 117. With the arrangement as described above, in the case the clutch 113 is turned off, the screw 123 is loosened to abut the rubber pad 120 against the manually rotatable pulley 117, if the manually operated grip 122 is rotated, then the manually rotatable shaft 119 is rotated through the agency of a set-screw 126 provided between the grip 122 and the manually rotatable shaft 119 and a groove 127, whereby the pulley 117 abutted against the rubber pad 120 at an eccentric position is rotated, so that the output gear 116 fixed on the output rotary shaft 114 can be rotated.

Figure 2:
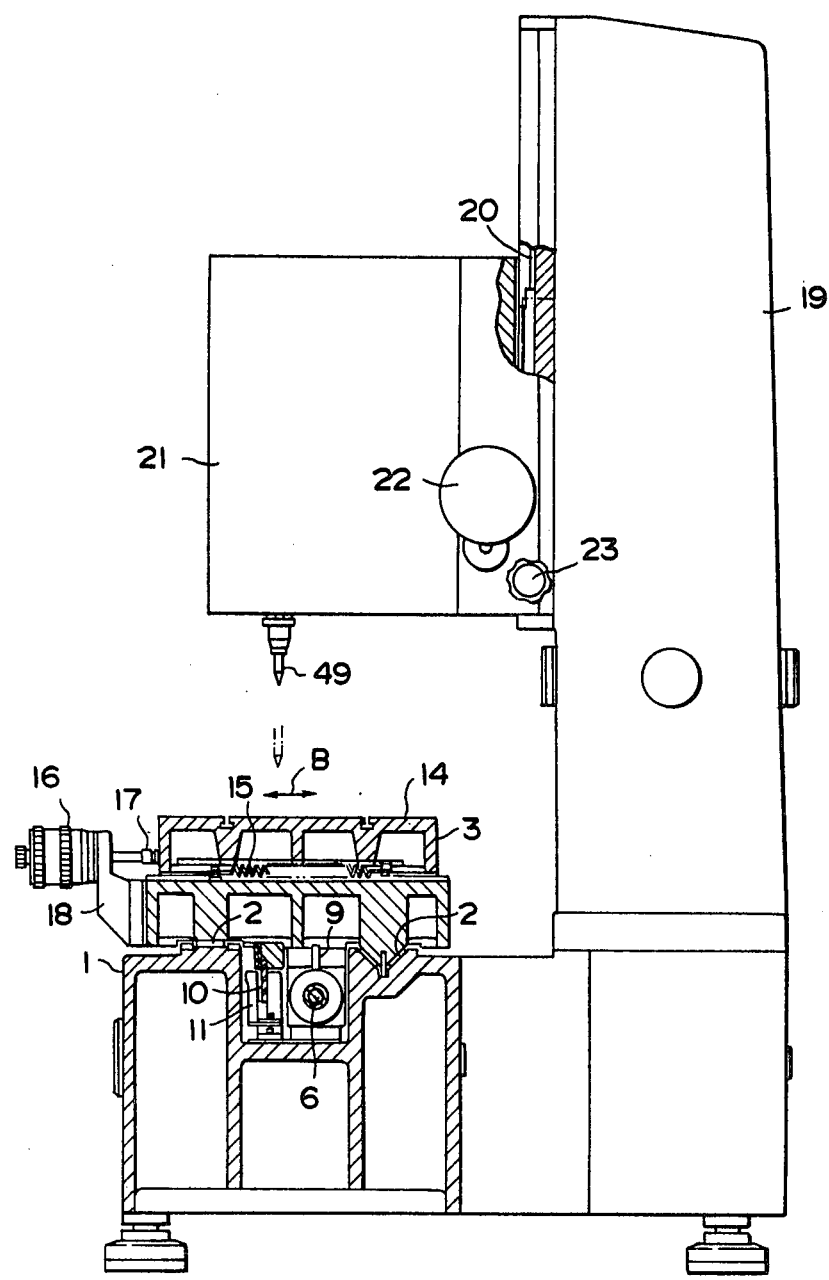
FIG. 2 is an enlarged right hand side view of FIG. 1, with essential portions being shown in cross-section.

In addition, in FIGS. 8 through 11, a reference numeral 128 indicates a cover of the driving mechanism 7, and a reference numeral 130 in FIG. 1 indicates a control panel for the respective driven portions, with which are performed various controls such as turning on or off of power source, setting the feeding direction and feed rate of the table 3 and vertically moving the stylus 49.

The configured control measuring apparatus described above is operated in the following manner. The motor 65 with the gearing is driven to elevate the square shaft 36 through the wire 67, guide tube 69 and mounting disk 50, whereby the stylus 49 is separated from the mount base 14. Subsequently, the object to be measured is fixed on the mount base 14, and the microhead 16 is operated to set the cross-section of the object to be measured. In this condition, the driving mechanism 7 is driven to position the stylus 49 at one end of the cross-section of the object to be measured, and further, the motor 65 with the gearing in the detecting head 21 is driven to lower the guide tube 69 to the lowermost position, i.e., a position where the working member 73 is sensed by the lower sensing mechanism 75. Along with the lowering movement as described above, the square shaft 36 is progressively lowered also. However, the descent of said square shaft 36 is stopped when the stylus 49 comes into abutting contact with the object to be measured. Here, fine adjustment in measuring position is performed manually or in the like manner.

Subsequently, if a predetermined speed of the driving mechanism 7 is selected and a switch on the control panel 130 is operated, then the driving motor 78 of the driving mechanism 7 and the respective clutches 98 through 101 are driven in accordance with a command, whereby the feed screw shaft 6 is driven in a predetermined direction and at a preset speed. With the arrangement as described above, the table 3 connected to the feed screw shaft 6 through the split nut 5 is fed in a predetermined direction. Movement of said table 3 causes the object to be measured on the mount base 14 to move, whereby the stylus 49 vertically moves along the irregularities on the surface of the object to be measured, thus enabling to measure the surface contour at the predetermined cross-section of the object to be measured. In this case, the square shaft 36 is supported by the guide block 34 through the pneumatic bearing, the pulleys 52, 53, around which is suspensively wound the hanging line 51, are also supported by the pneumatic bearing, and further, because most of the weight of the square shaft 36 is balanced by the balancer weight 54 and a slight weight acts on the object to be measured through the stylus 49, the stylus 49 can measure the surface contour of the object to be measured, fully tracing the surface contour thereof.

Furthermore, a movement value of the table 3 is measured as a digital value by the glass scale 10 and measuring mechanism 11. On the other hand, movements of the linear scale 44 and index scale 45 are measured in digital value by the light emitting elements 43 and light receiving elements 48 so as to measure a movement value of the square shaft 36 being the sliding shaft, and the values thus measured are indicated by an indicator, not shown, recorded by a recorder, and printed by a printer. Further, in the measurement, vertical positioning of the detecting head 21 is performed by loosening the clamp screw 23 and moving the handle 22, and thereafter, the resultant positioning is fixed by the clamp screw 23.

According to the present embodiment as described above, the surface contour of the object to be measured is measured by use of the stylus 49 being vertically, rectilinearly movable, so that the errors due to the circularly arcuate movement which have been unavoidable with the conventional arm-type configured contour measuring apparatus can be eliminated. Furthermore, the square shaft 36 having the stylus 49 is supported by the pneumatic bearing, balanced by the balancer weight, and the hanging bearing is received by the pulleys 52, 53 supported by the pneumatic bearing, so that the stylus 49 can be very smoothly moved, the stylus caught and broken at a steep slope which would occur with the conventional configured contour measuring apparatus can be eliminated and occurrences of the measurement errors can be minimized. For example, in the conventional configured contour measuring apparatus, the fulcrum is constituted by a lead spring, whereby the angle, at which the stylus can trace the object to be measured, is limited to about 75 to 78 degrees, whereas, in the configured contour measuring apparatus according to the present invention, the pneumatic bearing is adopted, whereby, it is found, the stylus can easily elevated at an angle as steep as 83 degrees. Further, the movement values of the stylus 49 and table 3 are measured in digital value, so that precision measurement can be achieved.

In addition, in working the invention, not only the combination of the scales made of glass with the optical elements but also electromagnetic means such as an Inductosyn and a Magnescale may be adopted as the detecting mechanism for detecting the digital values. Additionally, the sliding portion between the square shaft 36 and pulleys 52, 53 should not necessarily be formed into pneumatic bearing, which would minimize the sliding resistance and improve the measuring accuracies when adopted.

As apparent from the above, according to the present invention, the sliding shaft being vertically slidable is adopted and a movement of said sliding shaft can be detected as a digital value, and hence, there is offered such an advantage that the configured contour measurement can be performed at high accuracies.

What is claimed is:

1. A configured contour measuring apparatus comprising:
   a table 3 movably provided on a bed 1;
   a driving mechanism 7 for moving said table;
   first detecting mechanisms 10, 11 for detecting a movement value of said table relative to the bed as a digital value;
   a mount base 14 provided on said table and made movable in a direction perpendicular to movement of said table;
   a detecting head 21 secured to a column 19 erected on said bed;
   a sliding shaft 36 slidably provided on said detecting head and having a stylus 49 at the lower end thereof in opposed relationship with said mount base;
   a balancer weight 54 connected through a hanging line 51 to said sliding shaft and made slightly lighter in weight than said sliding shaft;
   pulleys 52, 53 for supporting the intermediate portion of said hanging line; and
   second detecting mechanisms 43, 44, 45 and 48 for detecting a movement value of said sliding shaft as a digital value.

2. A configured contour measuring apparatus as set forth in claim 1, wherein said detecting head is secured to said column in a manner to be adjustable in height and position, and said second detecting mechanisms are adapted to detect the relative movement of said sliding shaft with said detecting head.

3. A configured contour measuring apparatus as set forth in claim 1, wherein said second detecting mechanisms are digital reading means comprising: light emitting elements 43 mounted on the side of a guide block 34 fixed in said detecting head; an index scale 45 and light receiving elements 48; and a linear scale 44 mounted on the side of the sliding shaft.

4. A configured contour measuring apparatus as set forth in claim 1; wherein said sliding shaft is a shaft being square in section and slidably coupled into a square hole 35 of a guide block 34 fixed in said detecting head, and means is provided for feeding compressed air in a space for sliding formed between said sliding shaft and said square hole to form a pneumatic bearing.

5. A configured contour measuring apparatus as set forth in claim 1, wherein said pulleys 52, 53 are rotatably, pivotally supported by a hollow shaft 57 provided on said detecting head 21, compressed air is fed into said hollow shaft and blown out of air ejection ports 59 formed in said hollow shaft so as to form a pneumatic bearing on the bearing surface of said pulleys.

6. A configured contour measuring apparatus as set forth in claim 1, wherein said sliding shaft 36 is vertically moved by an electric motor 65 mounted in said detecting head 21, and the upper and lower limits thereof is regulated by limit switches 74, 75.

7. A configured contour measuring apparatus as set forth in claim 1, wherein said first detecting mechanisms comprises: a scale 10 made of glass secured to said table; and digital reading means 11 secured to said bed.

8. A configured contour measuring appratus as set forth in claim 1, further comprising a microhead 16 for moving said mount base relative to the table 3, measuring the positions of said mount base.

* * * * *

UNITED STATES PATENT AND TRADEMARK OFFICE
CERTIFICATE OF CORRECTION

PATENT NO. : 4,255,862
DATED : Mar. 17, 1981
INVENTOR(S) : Tetsuo Nakamura

It is certified that error appears in the above—identified patent and that said Letters Patent is hereby corrected as shown below:

At [73] Assignee:, change "MITUTOYO MANUFACTURING COMPANY INC." to --MITUTOYO MFG. CO., LTD.--.

Signed and Sealed this

Twenty-ninth Day of September 1981

[SEAL]

Attest:

GERALD J. MOSSINGHOFF

Attesting Officer

Commissioner of Patents and Trademarks